(12) United States Patent
Rowe (10) Patent No.: US 6,688,812 B2
(45) Date of Patent: Feb. 10, 2004

(54) HYDRAULIC BARRIER (76) Inventor: Ivan Rowe, 61D Townhill Road, Portglenone, County Atrium BT44 8AG, Northern Ireland (GB)

( * ) Notice: Subject to any disclaimer, the term of this patent is extended or adjusted under 35 U.S.C. 154(b) by 0 days.

(21) Appl. No.: 10/141,292

(22) Filed: May 8, 2002

(65) Prior Publication Data
US 2002/0182012 A1 Dec. 5, 2002

(30) Foreign Application Priority Data

| May 8, 2001 | (GB) | ............................................. 0111150 |
| Apr. 29, 2002 | (GB) | ............................................. 0209747 |

(51) Int. Cl.⁷ .............................. B09B 1/00; E02D 29/02
(52) U.S. Cl. .............................. 405/129.85; 405/129.7; 405/129.8; 405/267
(58) Field of Search ....................... 405/129.45, 129.55, 405/129.57, 129.6, 129.7, 129.8, 129.85, 129.95, 267, 270, 284

(56) References Cited

U.S. PATENT DOCUMENTS

| 5,354,149 A | * | 10/1994 | Breaux | .................... 405/129.6 |
| 5,360,294 A | * | 11/1994 | Carriker et al. | ............. 405/270 |
| 5,423,629 A | * | 6/1995 | Zimmerman | ............. 405/129.8 |
| 5,906,572 A | * | 5/1999 | Holland | ...................... 588/255 |
| 5,980,155 A | * | 11/1999 | Jones et al. | .................... 405/43 |
| 6,074,132 A | * | 6/2000 | Davies et al. | ............. 405/129.6 |

OTHER PUBLICATIONS

CETCO Products: Soil Sealants Volclay® TG–50, Jan.2000.*

* cited by examiner

Primary Examiner—Robert E. Pezzuto
Assistant Examiner—Tara L. Mayo
(74) Attorney, Agent, or Firm—Van Dyke, Gardner, Linn & Burkhart, LLP (57) ABSTRACT

A hydraulic barrier for particular use in sealing the perimeter of landfill sites, the barrier comprising a geosynthetic clay liner, preferably containing prehydrated sodium bentonite, which geosynthetic clay liner is supported in a substantially vertical orientation by a support frame comprising a pair of spaced apart support frame members between whose substantially parallel inner surfaces the geosynthetic clay liner is located and maintained.

28 Claims, 6 Drawing Sheets

HYDRAULIC BARRIER

FIELD OF THE INVENTION

The present invention relates to a hydraulic barrier for use in sealing the perimeter of, in particular, landfill sites, most particularly, municipal solid waste sites.

BACKGROUND OF THE INVENTION

One of the biggest problems to be addressed with regard to municipal solid waste (MSW) landfills is the migration of leachate from within the landfill to the surrounding land. Leachate is liquid which has percolated through the solid waste or other medium and has extracted from it, dissolved or suspended materials, which may include potentially harmful material. In the United Kingdom alone, approximately 120 million tonnes of controlled waste, including 20 million tonnes of domestic waste, are dumped in MSW landfills every year.

In the past, one of the most common means of preventing leaching from landfill sites was to line the landfill with high density polyurethane (HDPE) sheeting, thereby providing a waterproof barrier about the boundary of the site. However, one major problem associated with such a system is that, once punctured, the HDPE sheeting becomes ineffective at that location. Furthermore, such HDPE sheeting is extremely susceptible to such puncturing, and in addition, the overlapping edges of adjacent HDPE sheets must be welded together in order to prevent the migration of leachate from therebetween.

Geosynthetic clay liners (GCL's) are widely employed in landfill barrier systems. A GCL is a relatively thin layer of processed clay, preferably bentonite, which is either fixed between two sheets of geotextile or bonded to a geomembrane. A geotextile is a woven or nonwoven material which is largely impervious to liquid, and is also largely resistant to penetration damage. A geomembrane is a polymeric sheet material that is impervious to liquid. Bentonite, a granular clay formed from volcanic ash, is extremely absorbent, and attracts positively charged water particles. Therefore, once exposed to liquid (water or leachate), bentonite rapidly hydrates, causing swelling, which gives the clay the ability to self heal holes in a GCL. The quality of the clay used effects various characteristics of a GCL, the most important being the hydraulic conductivity (permeability) thereof. Sodium bentonite, a naturally occurring compound in a silicate clay formed from volcanic ash, provides bentonite with its distinctive property.

As a GCL hydrates, it becomes slightly flowable, which gives the GCL its self healing properties. It is therefore recommended that the side walls defining a land fill site are formed with a gradient of no greater than approximately 30° from the horizontal, if same are to be lined with a GCL. This is due to the fact that the loading on a GCL, if disposed at a steeper gradient, may result in unacceptable deformation of the GCL, which could compromise the integrity thereof. The loading results from the force acting on the GCL as a result of its own dead weight, in addition to the weight of the refuse or other matter sitting thereon. This therefore means that a substantial volume at the perimeter of each landfill must be surrendered in order to include such sloping side walls, thereby significantly decreasing the capacity of the site.

SUMMARY OF THE INVENTION

It is therefore an object of the present invention to maximise the capacity of a landfill site.

It is a further object of the present invention to provide a hydraulic barrier which is relatively inexpensive and easy to install, and which can furthermore be transported with ease.

It is a still further object of the present invention to provide a hydraulic barrier which enables the at least partial decontamination of material contained, by the hydraulic barrier, in a landfill site or the like.

It is a still further object of the present invention to provide an improved hydraulic barrier which utilises a GCL.

The present invention therefore provides a hydraulic barrier comprising a geosynthetic clay liner; characterised in that a support frame is provided, the support frame being adapted and arranged to support the geosynthetic clay liner in a substantially vertical orientation.

Preferably, the geosynthetic clay liner comprises sodium bentonite.

Preferably, the support frame comprises a pair of spaced apart support frame members, the geosynthetic clay liner being located between said pair of support frame members.

Preferably, each support frame member is urged or pressed into face to face engagement with the geosynthetic clay liner in order to apply pressure thereto.

Preferably, the support frame further comprises a pair of spaced apart outer members between which the pair of support frame members and the geosynthetic clay liner are located.

Preferably, a cavity is defined between the outer member and the support frame member on each side of the geosynthetic clay liner, each cavity being filled with a granular material, most preferably pea gravel.

Preferably, the pair of support frame members are substantially reticulated.

Preferably, each outer member is connected to the corresponding support frame member by means of a plurality of struts extending therebetween.

Preferably, each outer member is provided with a lining, preferably a geotextile lining, most preferably a non-woven geotextile lining.

Preferably, each strut is hingedly connected to the respective support frame member and to the respective outer member.

Preferably, each outer member is further connected to the corresponding support frame member by means of a plurality of braces, the braces being hingedly connected to the respective support frame member and to the respective outer member.

In one embodiment of the invention, the hydraulic barrier comprises a pair of spaced apart geosynthetic clay liners, each of which is supported in a substantially vertical orientation by the support frame.

Preferably, the support frame comprises two pairs of support frame members, each geosynthetic clay liner being located between a respective one of said two pairs of support frame members.

Preferably, the pair of geosynthetic clay liners define a core therebetween, within which core may be collected any leachate which passes through either geosynthetic clay liner into the core.

Preferably, the core is filled with a granular material.

Preferably, the core, once filled with the granular material, is further filled with a liquid into which the leachate may be entrained.

Preferably, the liquid may be withdrawn from the core to permit the decontamination thereof.

Preferably, the decontaminated liquid may be returned to the core.

Preferably, the liquid and/or granular material within the core is adapted for the bioremediation of at least a portion of the leachate within the core.

Preferably, the liquid within the core has a greater pressure head than the leachate located externally of the core.

Preferably, the support frame is collapsible to facilitate the transport and/or storage of the hydraulic barrier.

As used herein, the term "geosynthetic clay liner (GCL)" is intended to mean a layer of processed clay such as, but not limited to, bentonite, which layer of clay is preferably maintained between a pair of outer sheets, or similar substrates, such as geotextiles, which are substantially impervious to penetration by both liquids and solid materials, thereby forming a composite structure with the layer of clay, the GCL thus having an extremely low hydraulic conductivity, preferably in the range of $1 \times 10^{-12}$ m/sec to $1 \times 10^{-14}$ m/sec for landfill leachate, diesel, oil, petrol, etc.

As used herein, the term "reticulated" is intended to mean being formed substantially from apertures, such as to form a mesh.

As used herein, the term "entrained" is intended to mean the action of one liquid becoming mixed with another, whether the two liquids are miscible or not.

These and other objects, advantages, purposes and features of this invention will become apparent upon review of the following specification in conjunction with the drawings.

BRIEF DESCRIPTION OF THE DRAWINGS

The present invention will now be described with reference to the accompanying drawings, in which.

DESCRIPTION OF THE PREFERRED EMBODIMENTS

Referring now to the FIGS. 1 to 4 of the accompanying drawings, there is illustrated a first embodiment of a hydraulic barrier, generally indicated as 10, for use in sealing the perimeter of landfills (not shown), and in particular municipal solid waste (MSW) landfills (not shown). The barrier 10 comprises a geosynthetic clay liner (GCL) 12 as hereinbefore defined, which GCL 12 is housed within a support frame 20. In the present embodiment, the GCL 12 consists of a sodium bentonite layer 14 enclosed within a geotextile skin 16 on either side thereof. As the GCL 12 is intended to prevent the contamination of the land surrounding a MSW landfill or the like, it is desirable that the GCL 12 is extremely reliable and thus manufactured to a high specification. The GCL 12 is therefore preferably manufactured in accordance with BSEN ISO 9002 standard. The geotextile skin 16 is preferably formed from a UV stable woven or non-woven geotextile, for example Polyfelt TS 30, as manufactured by Polyfelt Geosynthetics (UK) Ltd, Shropshire, United Kingdom, while the bentonite layer 14 disposed therebetween is, in the preferred embodiments illustrated, preferably of a thickness of no less than 4.6 mm. The bentonite layer 14 should preferably have a bentonite content of approximately 5 kg/m$^2$ of the GCL 12, and have a minimum montmorillonite content of approximately 90%. The GCL 12 should also preferably have a swell index of 18.5 ml, as measured according to the swell index tests set out in the ASTM D 5890 test procedure, and a water absorption of 550%, meaning that the GCL 12 is capable of absorbing 5.5 times it's own weight in water. The bentonite layer 14 should be hydrated under factory conditions with liquid polymers using vacuum air extraction and high pressure die extrusion. The geotextile skin 16 on either side of the bentonite layer 14 is then introduced during a laminating process as the bentonite layer 14 is extruded.

Figure 1:
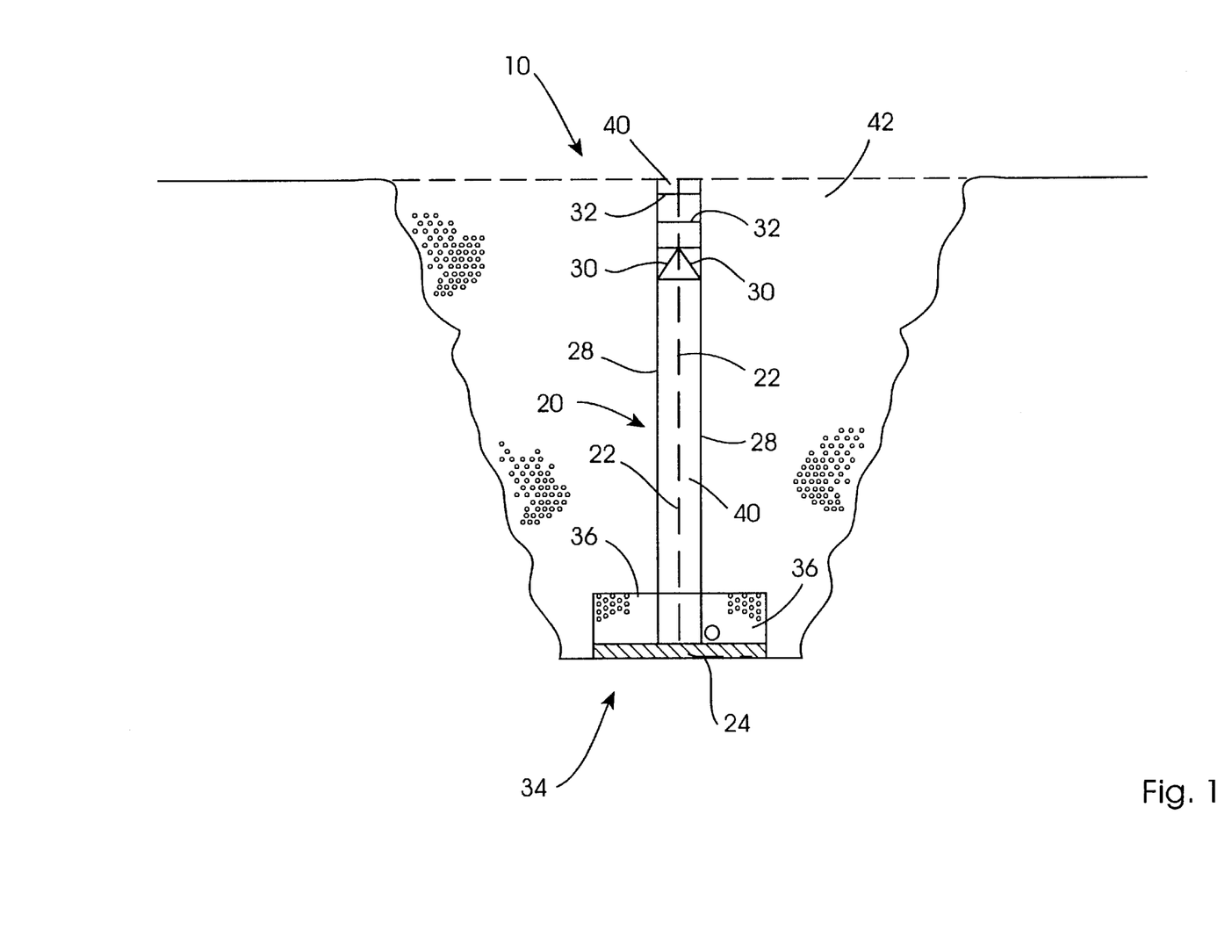
FIG. 1 illustrates a cross sectional elevation of a first embodiment of a hydraulic barrier according to the present invention.
Figure 2:
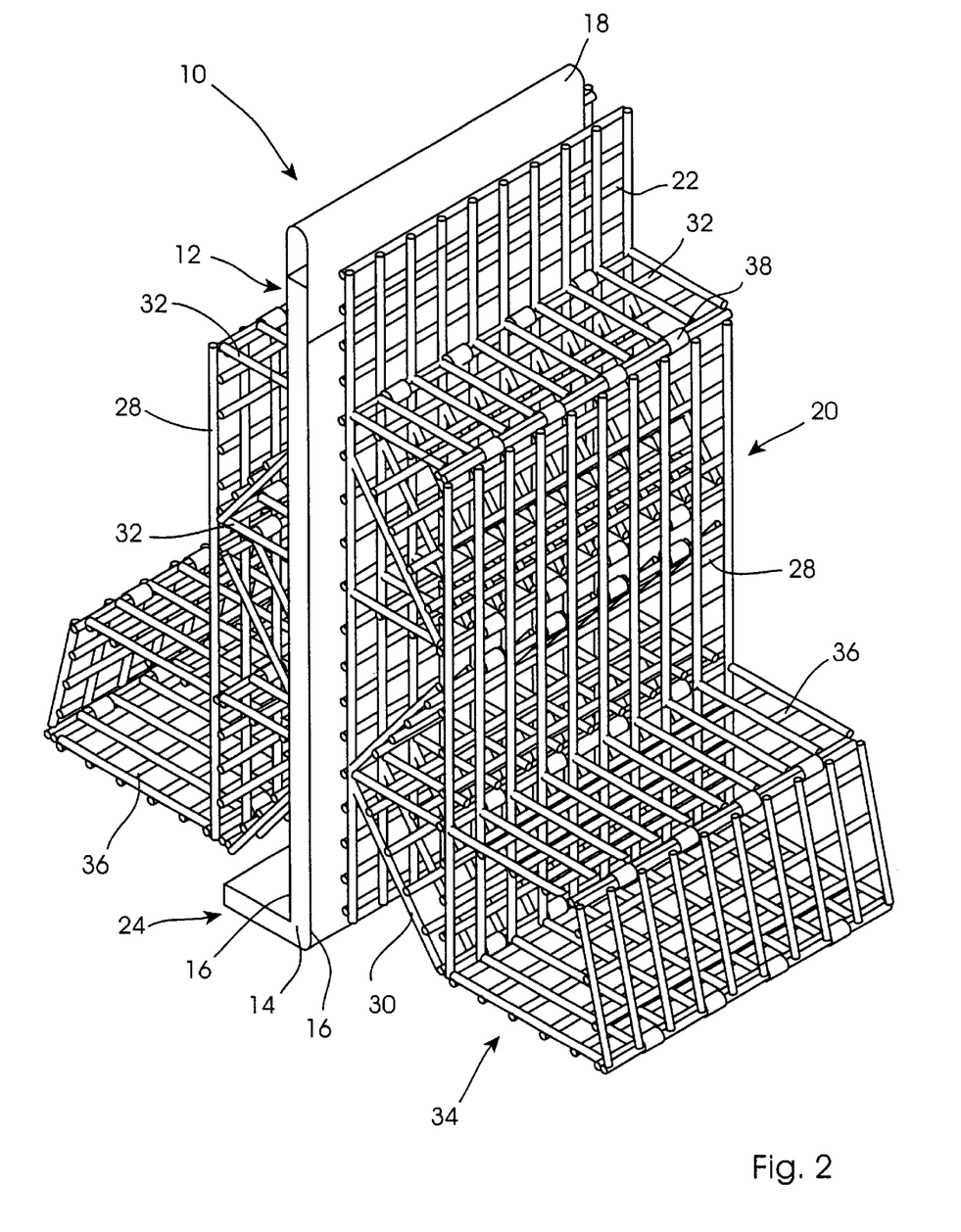
FIG. 2 illustrates a perspective view of the hydraulic barrier of FIG. 1.

The GCL 12 is then enclosed between a pair of support frame members 22 of substantially planar configuration, which are preferably reticulated, and most preferably formed from wire mesh. The pair of support frame members 22 are maintained in face to face engagement with the GCL 12 by means of a plurality of ties (not shown) connected between the pair of support frame members 22, each tie (not shown) passing directly through the GCL 12. The ties (not shown) are tightened such that a pressure is applied to the GCL 12 from the pair of support frame members 22. The pressure to be applied by the pair of support frame members 22 to the GCL 12 must be sufficient to maintain the integrity, and prevent the downward flow, of the GCL 12 when supported in a substantially vertical position, while still permitting localised self healing of the GCL 12.

As the GCL 12 becomes slightly flowable when hydrated, and, in use, is vertically orientated in the hydraulic barrier 10 of the present invention, the GCL 12 must be restricted and confined by virtue of the pair of support frame members 22, which prevent unacceptable deformation of the GCL 12 upon hydration. This is a major consideration due to the vertical orientation, in use, of the GCL 12, which will result in significant gravitational influence thereon as a result of its own dead-weight, which weight will increase as the GCL 12 hydrates, in use. The GCL 12 does still however maintain sufficient localised flowability to seal around each of the ties (not shown) which pass therethrough, in addition to being capable of sealing any punctures which may occur during use of the barrier 10.

Figure 4:
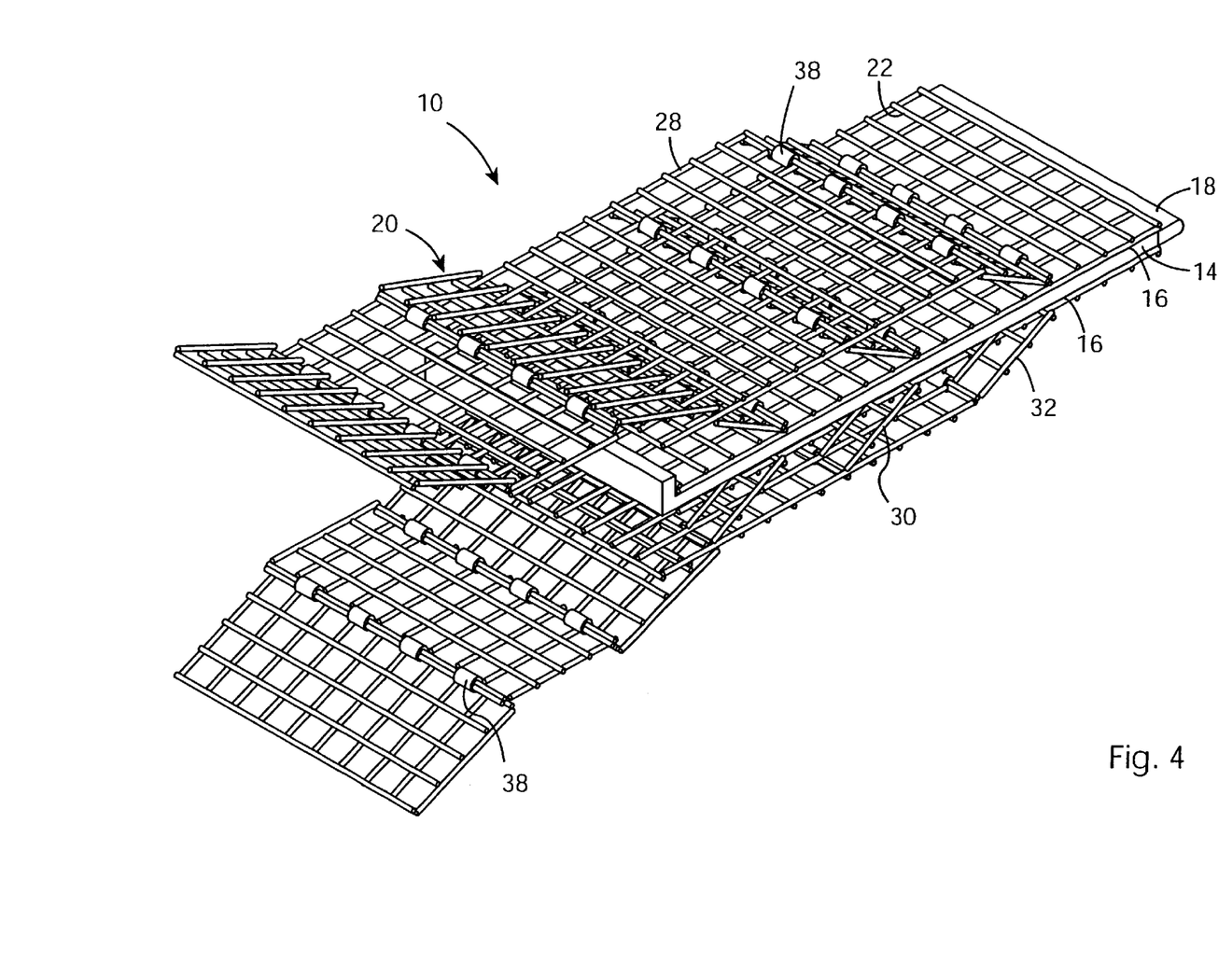
FIG. 4 illustrates a perspective view of the barrier of FIG. 1 in a collapsed state.

As it is required to stand the GCL 12 substantially vertically, adjacent the perimeter of the landfill site, the barrier 10 can be further provided with a pair of outer members 28 which are located in substantially parallel spaced relation to the pair of support frame members 22. The provision of the pair of outer members 28 allows the barrier 10 to be stood substantially upright at the desired location, provided that the ground is sufficiently even. Each outer member 28 is secured to the corresponding support frame member 22 by means of a plurality of support struts 32 which are preferably formed from galvanised steel, and are located at intervals down the height of the barrier 10. Furthermore, there are provided a plurality of angularly disposed hinged braces 30 disposed between each outer member 28 and the corresponding support frame member 22. Each support strut 32 and hinged brace 30 is hingedly connected to the respective support frame member 22 and to the respective outer member 28 by means of a plurality of clenched ferrules 38, such that, for the purposes of transport and storage, the support frame 20 may be collapsed as is illustrated in FIG. 4. The pair of outer members 28 are also formed from wire mesh.

A stabilising base 34 may also be provided, the base 34 preferably consisting of a wire gabbion 36 secured to each outer member 28. The gabbions 36 may be filled with ballast (not shown), for example any suitable aggregate, or rock, in order to provide further stability to the barrier 10. The combination of the pair of support frame members 22, the pair of outer members 28, and the base 34 form a preferred embodiment of the support frame 20.

The GCL 12 is provided, proximal the base 34, with a horizontal portion 24 to provide, in use, a substantial contact area with the bottom of the landfill site (not shown). As an alternative, or as a complimentary feature to the base 34 or gabbions 36, the barrier 10 could be provided with a conventional ground anchor (not shown). Such a ground anchor could be secured to a lower portion of the support frame 20, and sunk into the ground on which the barrier 10 stands. A typical example of such a ground anchor would be one or more piles (not shown) which are driven into the ground at a predetermined location, leaving an upper end thereof exposed, to which upper end may then be secured the barrier 10 in conventional fashion.

Thus, in use, the landfill site in question is excavated, with the boundary walls (not shown) being cut substantially vertically to maximise the volume and, therefore, the capacity of the site. Although the barrier 10 must extend around the entire perimeter of the landfill site, in terms of transport and construction, it would be impractical to manufacture the barrier 10 in excessive lengths. Therefore, in use, a plurality of barriers 10 are arranged in side by side relationship, each barrier 10 holding an individual GCL 12.

It will therefore be appreciated, in considering this configuration, that the lateral edges of each GCL must be sealed to the lateral edge of the adjacent GCL 12, in order to prevent leaching therebetween. Therefore, referring to FIG. 3 of the drawings, there is illustrated a sealing joint 44, which, as illustrated, maintains a first GCL 12a in side by side sealing engagement with a second GCL 12b. Prior to mating the first GCL 12a with the second GCL 12b, the interface therebetween is first coated with a paste seal 50 which preferably consists of hydrated bentonite having a slightly higher moisture content than the bentonite of either GCL 12a or 12b. The GCL 12a and 12b are then held in edge to edge engagement with one another, and the seal joint 44 is then applied as illustrated. The seal joint 44 consists of a split ball 48 which is secured along the length of the edge of the first GCL 12a by means of a plurality of nuts 52 and bolts 54 which pass through the GCL 12a.

Figure 3:
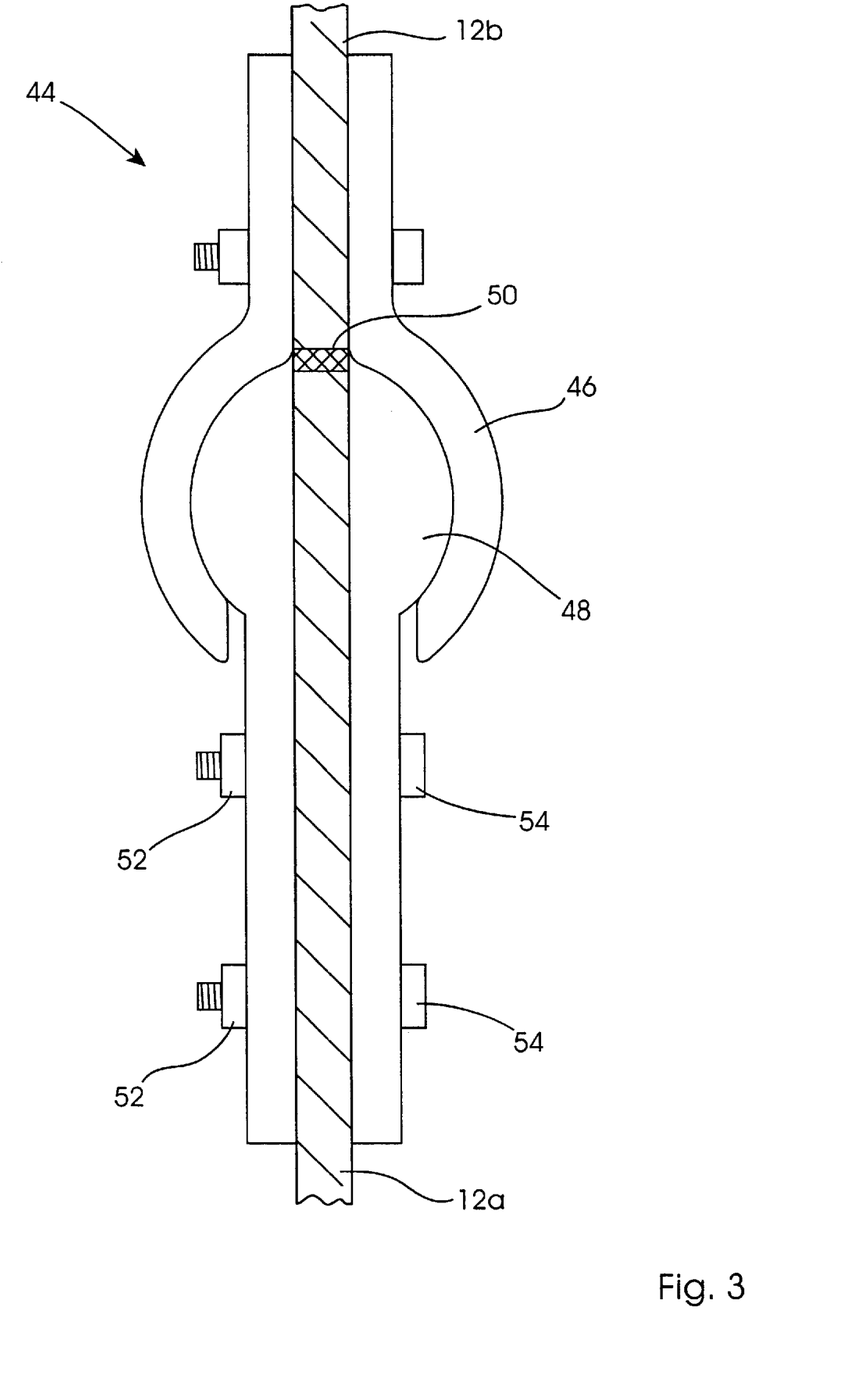
FIG. 3 illustrates a seal joint for use in connecting and sealing adjacent geosynthetic clay liner sheets which form part of the hydraulic barrier of the invention.

As with the plurality of ties (not shown), once the GCL 12a becomes hydrated, the holes (not shown) through which the bolts 54 pass, will seal themselves. The seal joint 44 further includes a split socket 46 which is secured along the length of the edge of the second GCL 12b, and around a portion of the split ball 48 as illustrated. Again the split socket 46 is secured to the second GCL 12b by means of a plurality of nuts 52 and bolts 54 passing through the second GCL 12b. The seal joint 44 therefore secures the first and second GCL 12a, 12b in edge to edge engagement, and once the first and second GCL 12a, 12b become hydrated, they flow together to form a complete seal therebetween. It will of course be understood that any other suitable means of sealing one GCL 12 to another GCL 12 could be utilised, and the seal joint 44 is simply one preferred method of achieving the required seal.

Once the barrier 10 has been erected around the perimeter of the excavated landfill site, a suitable granular material (not shown) such as an aggregate, for example pea gravel, is poured into a cavity 40 as defined by the support frame member 22 and the outer member 28 on either side of the GCL 12. Each outer member 28 is provided with a geotextile lining (not shown), preferably nonwoven, to serve as a backing thereto. The geotextile lining (not shown) prevents the aggregate from passing from the cavities 40 as a result of the reticulated nature of the pair of outer members 28. Although each support frame member 22 is also reticulated, the GCL 12 acts as a lining thereagainst, and thus the granular material acts through the reticulations in each support frame member 22 to apply a further static pressure to the GCL 12. It will thus be appreciated that this static pressure will further resist the deformation of the GCL 12. The provision of the granular material within the cavities 40 is of course an optional feature, as the ties (not shown) between the pair of support frame members 22 apply sufficient pressure to the GCL 12, via the pair of support frame members 22, to maintain the shape and integrity thereof. However, the granular material may also serve an additional purpose in that it may be in the form of a material that is capable of effecting the bioremediation of one or more contaminants present within the landfill about which the barrier 10 is located.

The GCL 12 is also provided with a protective plastic cover 18 to prevent damage to the GCL 12 during installation thereof. Once the GCL 12 has been installed, the plastic cover 18 is removed. The landfill site is then ready for use.

The barrier 10 of the present invention may also be used to replace the existing lining of any established land fill site. In this situation, a trench 42 is dug around the perimeter of the landfill site, the trench 42 being of sufficient width and depth to allow the barrier 10 to be lowered in. Once the trench 42 has been dug around the perimeter of the landfill site, a plurality of the barriers 10 are positioned within the trench 42, and adjacent GCL's 12 sealed in edge to edge engagement as hereinbefore described. Each side of the trench 42 is then backfilled with the material which was removed therefrom.

Figure 5:
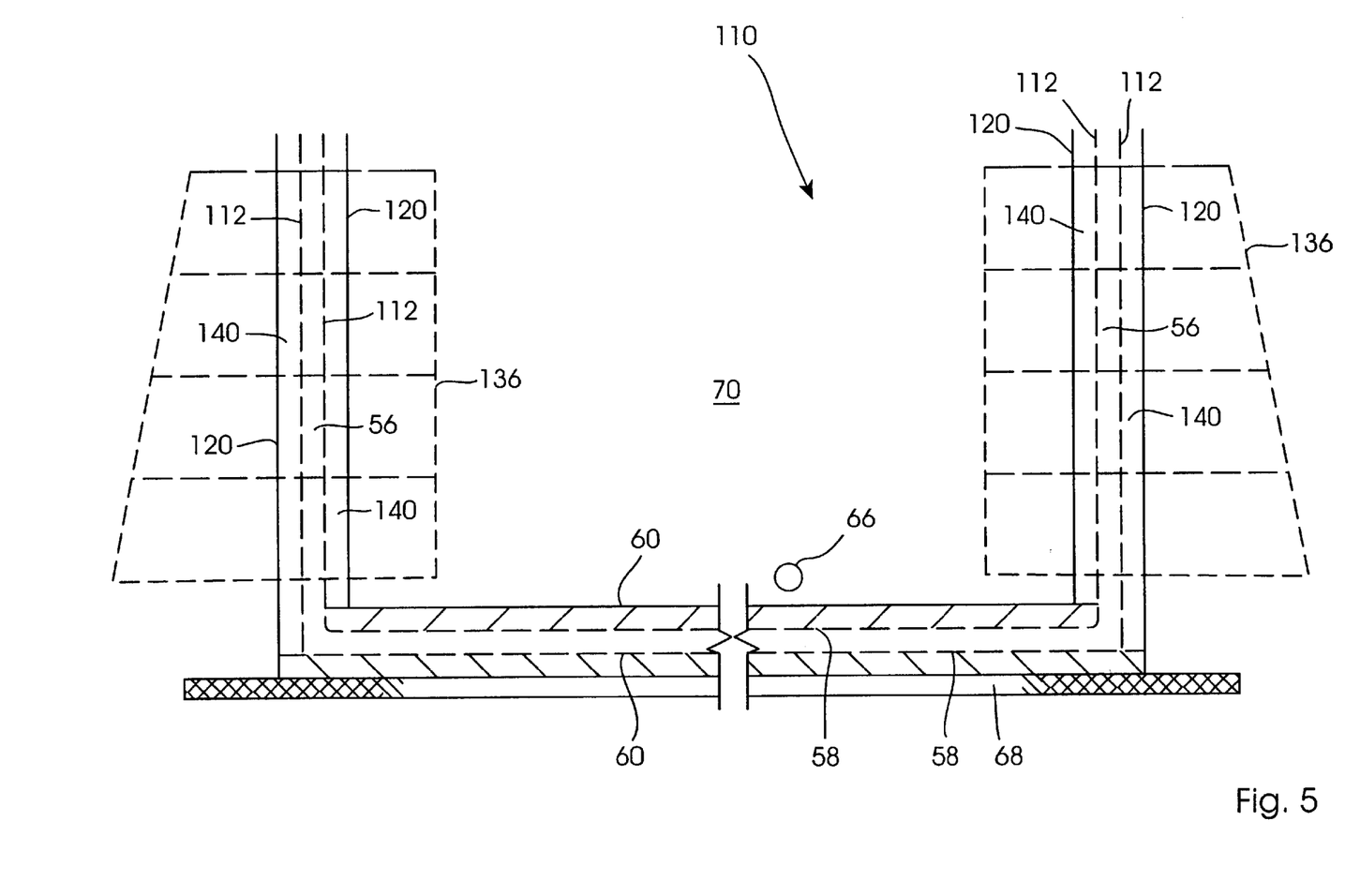
FIG. 5 illustrates a cross sectional elevation of a hydraulic barrier according to a second embodiment of the invention.
Figure 6:
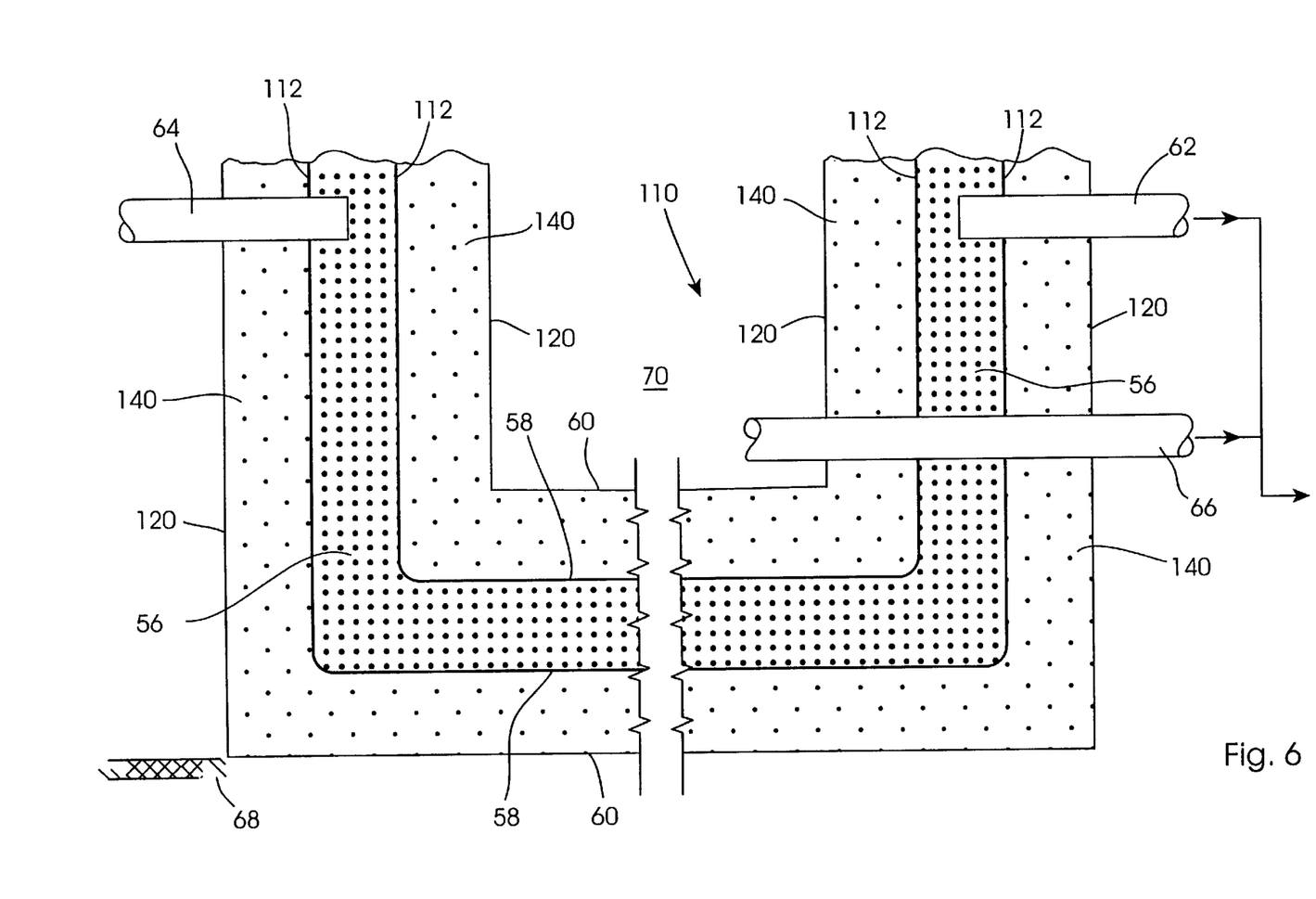
FIG. 6 illustrates a schematic cross sectional elevation of the hydraulic barrier of FIG. 5.

Referring now to FIGS. 5 and 6, there is illustrated a second embodiment of a hydraulic barrier, generally indicated as 110, again for use in sealing the perimeter of an enclosure 70, such as a municipal solid waste landfill. The barrier 110 is of similar configuration and operation to the barrier 10 of the first embodiment of the invention, and consequently like components have been accorded like reference numerals, and unless otherwise stated, perform like functions.

The barrier 110 therefore comprises a pair of GCL's 112 spaced apart from one another, and secured within a support frame 120 which comprises two pairs of support frame members (not shown) between which the GCL's 112 are clamped, as described with reference to the barrier 10 of the first embodiment. The barrier 110 is provided with a portion thereof at either side of the enclosure 70, and in addition preferably extends along the bottom of the enclosure 70. Thus each side of the barrier 110 is joined by means of a support frame base 60 and a pair of GCL bases 58 which are connected to each support frame 120 and GCL 112 respectively, such as to leave only the top of the enclosure 70 open, in order to permit the filling thereof with landfill. It will thus be appreciated that it is sufficient to describe the configuration and operation of a single side of the barrier 110. It will further be apparent that the barrier 110 need not take the form illustrated in FIGS. 5 and 6, but may be formed similar to the barrier 10 of the first embodiment, thus devoid of the portion of the barrier 110 traversing the bottom of the enclosure 70.

Located between each GCL 112 and a respective side of the support frame 120 is a cavity 140, which is filled, in use, with a granular material such as pea gravel (not shown), as with the first embodiment. Furthermore, each side of the support frame 120 is also provided with a geotextile lining (not shown), preferably nonwoven, to serve as a backing to the support frame 120 such as to ensure the complete retention of the granular material within the cavities 140, again as with the first embodiment of the invention.

However, the pair of GCL's 112 further define a core 56 therebetween, which core 56 is also preferably filled with a granular material such as pea gravel. The core 56 is then filled with a liquid, preferably water, such that, in the event that any leachate contained within the enclosure 70 were to leak through the inner GCL 112, the leachate would become entrained in the water within the core 56. The barrier 10 is therefore provided with a core drain 62 which is adapted to draw the water contaminated with the leachate from the core 56, wherein the contaminated water may be decontaminated, and preferably recycled into the core 56. For this purpose, the barrier 10 is provided with a core inlet 64 which is adapted to recycle the decontaminated water into the core 56. Although, in FIG. 6, the core drain 62 and the core inlet 64 are illustrated on opposed sides of the barrier 110, it will of course be appreciated that it is preferable to provide both a core drain 62 and a core inlet 64 on each side of the barrier 110, and most preferably a number of such drains 62 and inlets 64 along any given length of the barrier 110. As illustrated in FIG. 6, it is also preferable to provide a landfill drain 66 which is arranged to draw leachate from the enclosure 70, for the purposes of the decontamination thereof.

The filling of the core 56 with water also provides an additional advantage to that described above. It is therefore preferable that the level of water within the core 56 is maintained at a level greater than the level of leachate within the enclosure 70, thus ensuring that the water within the core 56 has a greater head of pressure than that of the leachate in the enclosure 70. Therefore, if a breach of the inner GCL 112 occurs, namely the GCL 112 which is directly adjacent the enclosure 70, there will be a flow of water from within the core 56 into the enclosure 70, rather than permitting the leachate to flow into the core 56 from the enclosure 70.

It is also preferable to provide a reactive medium or media (not shown) within the core 56, said media adapted to effect the bioremediation of any leachate which passes through the inner GCL 112 into the core 56. Any biogas generated by the bioremediation of the leachate within the core 56 may also be collected and used for any suitable purpose, for example as a fuel. Thus the barrier 110 can be employed to effect the at least partial decontamination of the landfill material contained within the enclosure 70. Specifically, the contaminants contained within the enclosure 70 may, over a extended period, pass into the core 56 via the inner GCL 112. Once contained within the core 56, the reactive media therein would biodegrade the contaminants, and so reduce the level of same within the enclosure 70. In order to increase the rate of decontamination, the inner GCL 112 could be specified with a higher hydraulic conductivity, thus permitting a greater volume of leachate to pass into the core 56 for decontamination. Thus the barrier 110 could be employed to neutralise the contaminants in existing landfill sites or the like.

Thus it can be seen that the barrier 110 of the second embodiment provides a number of advantages over the barrier 10 of the first embodiment of the invention, although each embodiment of the barrier 10, 110, represents a substantial advance over the landfill barriers of the prior art.

Changes and modifications in the specifically described embodiments can be carried out without departing from the principles of the invention, which is intended to be limited only by the scope of the appended claims as interpreted according to the principles of patent law.

The embodiments of the invention in which an exclusive property or privilege is claimed are defined as follows:

1. A hydraulic barrier comprising a geosynthetic clay liner; and a support frame adapted and arranged to support the geosynthetic clay liner in a substantially vertical orientation, the support frame comprising a pair of spaced apart support frame members, one on either side of the geosynthetic clay liner; wherein the pair of support frame members are urged into face to face engagement with the geosynthetic clay liner in order to apply pressure thereto such as to substantially prevent the deformation thereof.

2. A hydraulic barrier according to claim 1 in which the geosynthetic clay liner comprises sodium bentonite.

3. A hydraulic barrier according to claim 1 in which the pair of support frame members are substantially reticulated.

4. A hydraulic barrier according to claim 1 in which the support frame further comprises a pair of spaced apart outer members between which the pair of support frame members and the geosynthetic clay liner are located.

5. A hydraulic barrier according to claim 4 in which each outer member is connected to the corresponding support frame member by means of a plurality of struts extending therebetween.

6. A hydraulic barrier according to claim 5 in which each strut is hingedly connected to the respective support frame member and to the respective outer member.

7. A hydraulic barrier according to claim 4 in which each outer member is provided with a lining.

8. A hydraulic barrier according to claim 4 in which each outer member is further connected to the corresponding support frame member by means of a plurality of braces, the braces being hingedly connected to the respective support frame member and to the respective outer member.

9. A hydraulic barrier according to claim 1 comprising a pair of spaced apart geosynthetic clay liners each of which is supported in a substantially vertical orientation by the support frame.

10. A hydraulic barrier according to claim 9 in which the support frame comprises two pairs of support frame members, each geosynthetic clay liner being located between a respective one of said two pairs of support frame members.

11. A hydraulic barrier according to claim 1 in which the support frame is collapsible to facilitate the transport and/or storage of the hydraulic barrier.

12. A hydraulic barrier comprising a geosynthetic clay liner: characterized in that a support frame is provided, the support frame being adapted and arranged to support the geosynthetic clay liner in a substantially vertical orientation, the support frame comprising a pair of spaced apart support frame members, the geosynthetic clay liner being located between said pair of support frame members, each support frame member being urged or pressed into face to face engagement with the geosynthetic clay liner in order to apply pressure thereto, the support frame further comprising a pair of spaced apart outer members between which the pair of support frame members and the geosynthetic clay liner are located, in which a cavity is defined between the outer member and the support frame member on each side of the geosynthetic clay liner, each cavity being filled with a granular material.

13. A hydraulic barrier according to claim 12 in which the pair of support frame members are substantially reticulated.

14. A hydraulic barrier according to claim 13 in which each outer member is connected to the corresponding support frame member by means of a plurality of struts extending therebetween.

15. A hydraulic barrier according to claim 14 in which each outer member is provided with a lining.

16. A hydraulic barrier according to claim 15 in which each strut is hingedly connected to the respective support frame member and to the respective outer member.

17. A hydraulic barrier according to claim 16 in which each outer member is further connected to the corresponding support frame member by means of a plurality of braces, the braces being hingedly connected to the respective support frame member and to the respective outer member.

18. A hydraulic barrier according to claim 17 comprising a pair of spaced apart geosynthetic clay liners each of which is supported in a substantially vertical orientation by the support frame.

19. A hydraulic barrier comprising a geosynthetic clay liner; characterized in that a support frame is provided, the support frame being adapted and arranged to support the geosynthetic clay liner in a substantially vertical orientation, said hydraulic barrier comprising a pair of spaced apart geosynthetic clay liners each of which is supported in a substantially vertical orientation in the support frame, in which the pair of geosynthetic clay liners define a core therebetween, within which core is collected any leachate which passes through either geosynthetic clay liner into the core.

20. A hydraulic barrier according to claim 19 in which the core is filled with a granular material.

21. A hydraulic barrier according to claim 20 in which the core, once filled with the granular material, is further filled with a liquid into which the leachate is entrained.

22. A hydraulic barrier according to claim 21 in which the liquid and/or granular material within the core is adapted for the bioremediation of at least a portion of the leachate within the core.

23. A hydraulic barrier according to claim 21 in which the liquid within the core has a greater pressure head than the leachate located externally of the core.

24. A hydraulic barrier according to claim 20 in which the liquid is withdrawn from the core to permit the decontamination thereof.

25. A hydraulic barrier according to claim 24 in which the decontaminated liquid is returned to the core.

26. A hydraulic barrier according to claim 25 in which the liquid and/or granular material within the core is adapted for the bioremediation of at least a portion of the leachate within the core.

27. A hydraulic barrier according to claim 26 in which the liquid within the core has a greater pressure head than the leachate located externally of the core.

28. A hydraulic barrier according to claim 27 in which the support flame is collapsible to facilitate the transport and/or storage of the hydraulic barrier.

* * * * *

UNITED STATES PATENT AND TRADEMARK OFFICE
CERTIFICATE OF CORRECTION

PATENT NO.       : 6,688,812 B2
APPLICATION NO.  : 10/141292
DATED            : February 10, 2004
INVENTOR(S)      : Ivan Rowe It is certified that error appears in the above-identified patent and that said Letters Patent is hereby corrected as shown below:

Title page, item [76]
IN THE HEADING (under Ivan Rowe)
"County Atrium" should be --Country Antrim--

Column 8
Claim 12, Line 59, "liner:" should be --liner;--

Column 9
Claim 19, Line 33, "in" should be --by-- after "orientation"

Column 10
Claim 28, Line 30, "flame" should be --frame--

Signed and Sealed this

Twentieth Day of January, 2009

JON W. DUDAS
*Director of the United States Patent and Trademark Office*